United States Patent
Darrer (10) Patent No.: US 10,619,992 B2
(45) Date of Patent: Apr. 14, 2020

(54) DEVICE, A TIRE PRESSURE MEASUREMENT DEVICE, A TIRE, A METHOD AND A COMPUTER PROGRAM TO OBTAIN INFORMATION INDICATING A TREAD DEPTH

(71) Applicant: Infineon Technologies AG, Neubiberg (DE)

(72) Inventor: Franz Michael Darrer, Graz (AT)

(73) Assignee: Infineon Technologies AG, Neubiberg (DE)

( * ) Notice: Subject to any disclaimer, the term of this patent is extended or adjusted under 35 U.S.C. 154(b) by 466 days.

(21) Appl. No.: 15/259,288

(22) Filed: Sep. 8, 2016

(65) Prior Publication Data

US 2017/0097223 A1 Apr. 6, 2017

(30) Foreign Application Priority Data

Oct. 6, 2015 (DE) .................... 10 2015 117 024

(51) Int. Cl.
*G01B 7/26* (2006.01)
*B60C 23/04* (2006.01)
(Continued)

(52) U.S. Cl.
CPC .............. *G01B 7/26* (2013.01); *B60C 11/243* (2013.01); *B60C 23/0486* (2013.01);
(Continued)

(58) Field of Classification Search
CPC ..... B60C 11/24; B60C 11/243; B60C 11/246; B60C 2019/004; B60C 23/0411;
(Continued)

(56) References Cited

U.S. PATENT DOCUMENTS 3,815,407 A * 6/1974 Lavery .................. G01H 13/00
 73/582
3,919,882 A * 11/1975 Wells ................. B29D 30/0633
 73/146

(Continued)

FOREIGN PATENT DOCUMENTS

DE 20216290 U1 1/2003
WO 2015/044443 A1 4/2015
(Continued)

*Primary Examiner* — Randy W Gibson
*Assistant Examiner* — Gedeon M Kidanu
(74) *Attorney, Agent, or Firm* — Eschweiler & Potashnik, LLC (57) ABSTRACT

Embodiments provide a device, a tire pressure measurement system, a tire, a method and a computer program to obtain information indicating a tread depth of the tire. The device to obtain information indicating a tread depth of a tire of a vehicle comprises a transducer to provide acoustical signals based on electrical signals and vice versa. The device further comprises a control unit, which is coupled to the transducer. The control unit is configured to provide the transducer with a first electrical signal based on which the transducer provides an acoustical transmit signal. The control unit is further configured to obtain a second electrical signal from the transducer. The second electrical signal is based on a reflected version of the acoustical transmit signal. The control unit is further configured to process the second electrical signal to obtain information indicating the tread depth of the tire.

20 Claims, 4 Drawing Sheets

(51) Int. Cl.
  *G01B 17/00* (2006.01)
  *G01M 17/02* (2006.01)
  *G01B 17/02* (2006.01)
  *B60C 11/24* (2006.01)

(52) U.S. Cl.
  CPC .......... *B60C 23/0493* (2013.01); *G01B 17/00* (2013.01); *G01B 17/02* (2013.01); *G01M 17/02* (2013.01); *G01M 17/024* (2013.01)

(58) Field of Classification Search
  CPC . B60C 23/041; B60C 23/0493; B60C 23/064; B60C 23/0408; B60C 23/0455; B60C 23/0471; B60C 23/0488; B60C 23/0494; B60C 23/065; B60C 23/0486; G01B 17/00; G01B 7/26
  See application file for complete search history.

(56) References Cited

U.S. PATENT DOCUMENTS

| | | | | | |
|---|---|---|---|---|---|
| 4,059,989 | A | * | 11/1977 | Halsey | G01M 17/025 73/598 |
| 4,089,225 | A | * | 5/1978 | Kraska | G01M 17/025 73/614 |
| 4,089,226 | A | * | 5/1978 | Kraska | G01M 17/025 73/146 |
| 4,469,450 | A | * | 9/1984 | DiVincenzo | G01K 11/24 374/119 |
| 5,837,897 | A | * | 11/1998 | Jones | G01L 17/00 73/599 |
| 8,578,767 | B2 | * | 11/2013 | Dussinger | B60C 23/0411 73/146.5 |
| 9,248,709 | B2 | * | 2/2016 | Darrer | B60C 19/00 |
| 9,849,724 | B2 | * | 12/2017 | Blandina | B60B 39/025 |
| 2007/0156320 | A1 | * | 7/2007 | Breed | B60C 23/0408 701/70 |
| 2008/0168833 | A1 | * | 7/2008 | Awad | G01M 17/02 73/146 |
| 2012/0089299 | A1 | * | 4/2012 | Breed | B60C 11/24 701/36 |
| 2015/0034222 | A1 | * | 2/2015 | Martin | B60C 11/243 152/154.2 |

FOREIGN PATENT DOCUMENTS

| | | | | |
|---|---|---|---|---|
| WO | WO 2015044443 | A1 * | 4/2015 | ............ B60C 13/00 |
| WO | WO-2015044443 | A1 * | 4/2015 | |

\* cited by examiner

DEVICE, A TIRE PRESSURE MEASUREMENT DEVICE, A TIRE, A METHOD AND A COMPUTER PROGRAM TO OBTAIN INFORMATION INDICATING A TREAD DEPTH

CROSS REFERENCE TO RELATED APPLICATIONS

This application claims priority to German Application No. 102015117024.8, filed on Oct. 6, 2015, and incorporated herein by reference in its entirety.

BACKGROUND

Embodiments relate to a device, a tire pressure measurement system, a tire, a method and a computer program to obtain information indicating a tread depth of the tire.

The tread depth of car tires can be considered an important feature for safe driving, especially under wet, icy or changing road conditions. Moreover, a minimum tread depth is required by government regulations in most countries. When driving, the outer surface of the tire is continuously worn by friction and abrasion during the repetitive contacts with the road. So gradually, the tread depth reduces. The driver should be aware of the tread depth of his tires but this is not always the case.

The tread depth can be measured, for example, by sticking a measurement tool into the profile of a tire and reading the depth. Such readings are carried out manually and are therefore cumbersome to carry out; therefore, it may be considered challenging to frequently measure the tire tread depth manually. Tire Pressure Monitoring Systems (TPMS) may measure the tire tread depth indirectly by evaluating a signal of an acceleration sensor of the TPMS, when the tire hits the road and when the tire leaves it again, which however also has dependencies on temperature, tire pressure, road surface etc., and may therefore not always be reliable. Other concepts may use accelerations of a running tread or contact area of the tire to obtain information on the condition of the tire tread. The condition of the tire tread may further depend on the material thickness of the tire or contact area. Furthermore, acceleration measurements may make use of complex measurement circuits and actual accelerations may depend on further parameters such as the age and temperature of the rubber material of the tire, which may distort absolute results of acceleration measurements.

For tire tread measurements a mileage counter may be used in some vehicles. Such a concept may count a number of revolutions or rotations of a tire and estimate an overall mileage of the tire. The wear or use of a tire tread may also depend on other factors such as style of driving (accelerations, braking behavior, high speed portion, etc.) and condition of the road surface, which may render an estimation based on a mileage of tire imprecise.

Some concepts are introduced by documents DE 202 16 290 U1 2002 and U.S. Pat. No. 8,578,767 B2 2011.

SUMMARY

Embodiments provide a device, a tire pressure measurement system, a tire, a method and a computer program to obtain information indicating a tread depth of the tire. Embodiments may use sounding measurements to obtain information related to sound reflections at inhomogeneities of a tire wall, which allows concluding on the thickness of layers of the tire and also the tread depth. Based on the tread depth an alarming system can be implemented to warn a driver of a vehicle that the tire tread is worn off.

Embodiments provide a device to obtain information indicating a tread depth of a tire of a vehicle. The device comprises a transducer to provide acoustical signals based on electrical signals and vice versa. The device further comprises a control unit, which is coupled to the transducer. The control unit is configured to provide the transducer with a first electrical signal based on which the transducer provides an acoustical transmit signal. The control unit is further configured to obtain a second electrical signal from the transducer, the second electrical signal being based on a reflected version of the acoustical transmit signal. The control unit is further configured to process the second electrical signal to obtain information indicating the tread depth of the tire. Embodiments may enable acoustic measurements to obtain information related to tire tread depth.

In some embodiments the device further comprises a transmitter to transmit tire tread depth information to a receiver of the vehicle. The transmitter is coupled to the control unit. The control unit may be configured to provide the information indicating the tread depth of the tire to the transmitter. Embodiments may enable transmission of tire tread depth information to a vehicle, for example, for displaying, alarming, or other purposes. In further embodiments the device may comprise an interface to communicate information with another device to obtain information indicating a tread depth of a tire. The control unit may be coupled to the interface and the control unit may be configured to control the interface. In such an embodiment the control unit may use the interface to provide or obtain information to/from the transmitter. Embodiments may allow inter-communication among a plurality of tire tread depth measurement devices.

The interface may be configured to transmit and/or to receive information from another device using sound, light or radio frequency communications. Embodiments may enable a short range or near field communication within a tire between multiple devices. In further embodiments the control unit may be configured to collect tire tread depth information from a plurality of tire tread measurement devices using the interface and process the tire tread depth information from the plurality of tire tread measurement devices to obtain the information indicating the tread depth. In some embodiments the device may assume a master role and collect and/or coordinate other devices or tire tread depth measurement sensors or devices to collect information from them, before forwarding the raw or processed information further to a receiver of the vehicle. In further embodiments the control unit may be further configured to provide the collected information to a further control component of the vehicle, be it through the interface, a transmitter or both. Embodiments may enable different communication options. For example, a number of devices may act autonomously, each providing tire tread depth information to a controller or receiver. Another option is a sort of adhoc network between the devices in which one device assumes a master role, other device assume slave roles.

The control unit may be configured to obtain information on whether to collect or to provide tire tread depth information via the interface in further embodiments. Embodiments may enable a triggered or event-based tire tread depth determination, which may further enable coordinated communication among devices or between devices and a receiver or controller of the vehicle. In some embodiments the transducer may be configured to generate the acoustical transmit signal based on a trigger from the control unit.

Embodiments may provide a transducer being capable of generating a probe or reference signal based on which reflections can be received. The control unit may then only provide a trigger or instructional signal for the transducer to generate the acoustical transmit signal. The transducer may be configured to generate the acoustical transmit signal and to receive the reflected version of the acoustical transmit signal. Embodiments may enable utilization of a single transducer device, unit or module to transmit the acoustical signal and to receive the reflected version of the acoustical transmit signal. The transducer may comprise an acoustical receiver to receive the reflected version of the acoustical transmit signal.

In some embodiments the device may comprise a plurality of transducers configured to provide a plurality of acoustical transmit signals and configured to obtain a plurality of reflected versions of the plurality of acoustical transmit signals. Embodiments may enable tire tread depth measurements or probing at multiple positions on a tire, which may increase the reliability of such measurements and may increase system stability and reliability.

In some embodiments the transducer may be configured to emit a burst of ultrasound as the acoustical transmit signal and to receive reflections of the burst as reflected version of the acoustic transmit signal. The transducer may be further configured to transduce the reflected version of the acoustical transmit signal into the second electrical signal. Ultrasound measurements may enable higher resolution or accuracy of the measurements than regular acoustic sound in the range of audibility. The control unit may be configured to determine multiple reflections of the acoustical transmit signal in the second electrical signal. The control unit may be further configured to determine the tread depth based on a relative timing of the multiple reflections in the second electrical signal. The relative timing of the reflection may provide additional reliability or accuracy of the measurement. The control unit may be configured to further determine the information indicating the tread depth based on one or more elements of the group of temperature information, aging information of the tire, material information, type information, pressure information, road or ground surface information. Considering such further information may enable a better calibration and may hence enable further improvement of the measurement confidence.

The control unit may be configured to determine information indicating a depth of a carcass of the tire in some embodiments. The control unit may be further configured to determine the information indicating the tread depth based on the information indicating the depth of the carcass. As the carcass may not wear off, the depth of the carcass may serve as a reference in relation to which the tread depth may be determined. The control unit may be configured to determine information indicating a presence of water on the tire by comparing a reflection before or after ground contact of the tire with a reflection during ground contact of the tire. Embodiments may enable tread depth measurements with water film or layer compensation. Embodiments may enable aquaplaning risk detection and a driver of a vehicle may be warned accordingly. The control unit may be configured to excite a standing wave of sound between an inner and an outer tire surface. The control unit may be configured to determine a resonance frequency of the standing wave and the control unit may be further configured to determine whether a measured part of the tire has contact to the ground. Using standing wave resonance measurements may lower the complexity of the transducer and/or the subsequent signal processing.

The device may further be configured to convert mechanical energy from tire deformation into electrical energy for powering the device. Such embodiments may be autonomous; some embodiments might not need a battery. The control unit may be part of a tire pressure measurement system. Embodiment may provide an integrated tire pressure and tread depth measurement system. Embodiments further provide a tire comprising the above-described device. The device may be glued onto an inner surface of the tire or the device may be mounted into a fixture of the tire or a wheel carrying the tire. Embodiments also provide a tire pressure measuring system comprising the above described device.

Embodiments further provide a method for obtaining information indicating a tread depth of a tire of a vehicle. The method comprises providing a first electrical signal and providing an acoustical transmit signal based on the first electrical signal. The method further comprises obtaining a second electrical signal, the second electrical signal being based on a reflected version of the acoustical transmit signal, and processing the second electrical signal to obtain information indicating the tread depth of the tire.

Embodiments further provide a computer program having a program code on a non-transitory media for performing, when the computer program is executed on a computer or on a processor, one of the above methods. In general, embodiments also provide one or more computer programs having a program code for performing one or more of the above described methods, when the computer program is executed on a computer, processor, or programmable hardware component. A further embodiment is a computer readable storage medium storing instructions which, when executed by a computer, processor, or programmable hardware component, cause the computer to implement one of the methods described herein.

Embodiments further provide a vehicle or tire comprising a device, element or passive element as described above.

BRIEF DESCRIPTION OF THE DRAWINGS

Some other features or aspects will be described using the following non-limiting embodiments of apparatuses and/or methods and/or computer programs by way of example only, and with reference to the accompanying figures, in which.

DETAILED DESCRIPTION

In the following some components will be shown in multiple figures, where consistent reference signs refer to functionally identical or similar components. Repetitive descriptions may be avoided for simplicity purposes. Features or components depicted in dotted lines are optional.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers refer to like or similar elements throughout the description of the figures.

As used herein, the term, "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted in a like fashion.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements or components, but do not preclude the presence or addition of one or more other features, integers, steps, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
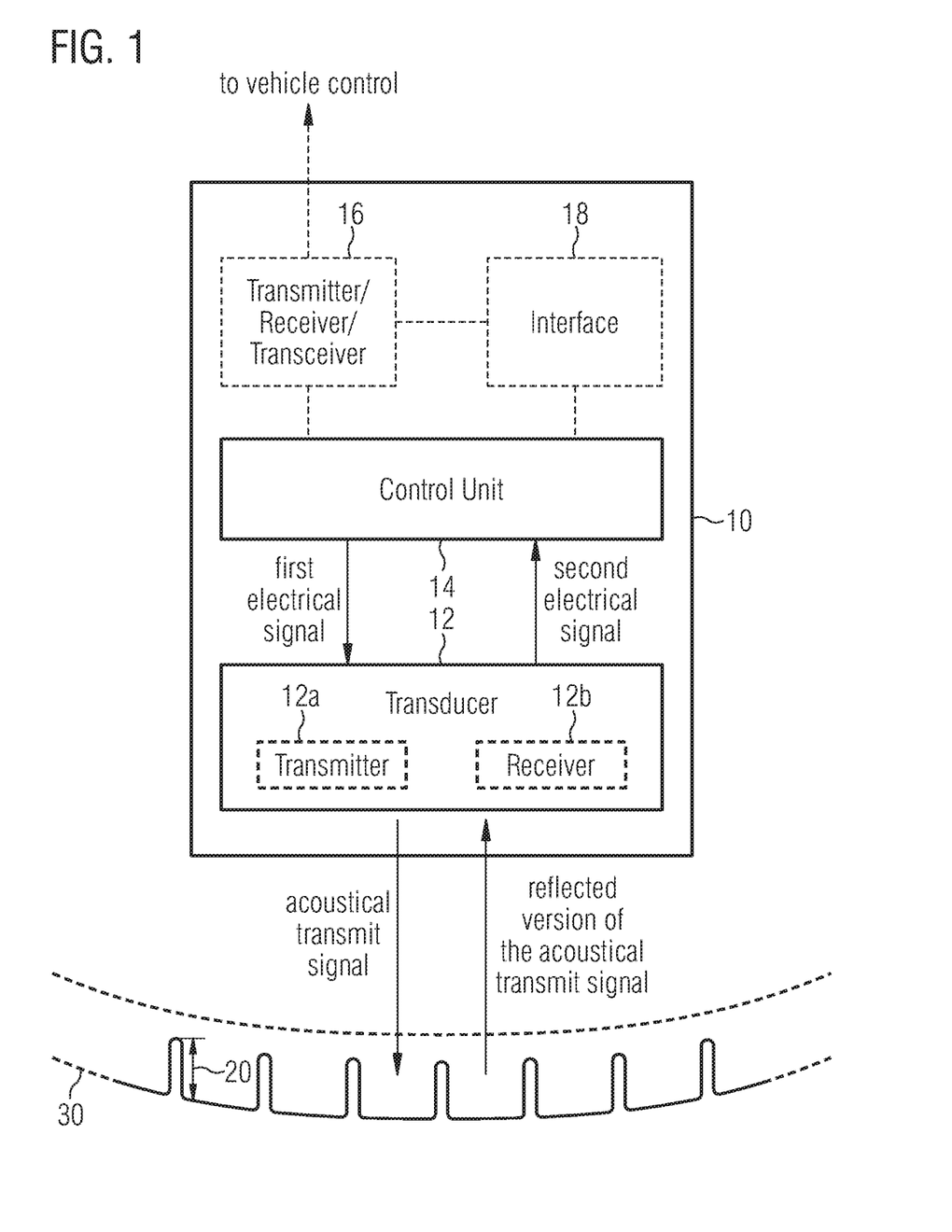
FIG. 1 shows a block diagram of an embodiment of a device to obtain information indicating a tread depth of a tire.

FIG. 1 shows a block diagram of an embodiment of a device 10 to obtain information indicating a tread depth 20 of a tire 30 of a vehicle. In the following a vehicle may comprise the tire 30, and a vehicle can be any vehicle using tires, as, for example, a car, a van, a truck, a bus, a plane, a bike, a motorbike, etc. Although, some embodiments may be exemplified using a car, any other vehicles can be utilized in embodiments. As shown in FIG. 1 the device 10 comprises a transducer 12 to provide acoustical signals based on electrical signals and vice versa. Here and in the following a transducer 12 is a unit, module or device capable of converting electrical energy, e.g. provide in form of an input signal or supply voltage, into acoustical/mechanical signals, e.g. in terms of a sound signal, sound waveform, sound impulse, sound wave, etc. Such a signal may have, for example, a frequency or a bandwidth in the range of infrasound, audible sound up to ultrasound. While microphones and loudspeakers are known to be able to conduct such signal conversions, certain materials, for example piezoelectric devices or crystals, may also be used as transducer 12. Ultrasonic, sonar, or magnetic sensors may be used to form a transducer 12, e.g. a sound receiver, transmitter or transceiver (a combined receiver and transmitter).

As further illustrated by FIG. 1 the device 10 comprises a control unit 14, which is coupled to the transducer 12. In embodiments, the control unit 14 may be implemented using one or more processing units, one or more processing devices, any means for processing, such as a processor, a computer or a programmable hardware component being operable with accordingly adapted software. In other words, the described functions of the control unit 14 may as well be implemented in software, which is then executed on one or more programmable hardware components. Such hardware components may comprise a general purpose processor, a Digital Signal Processor (DSP), a micro-controller, a Field Programmable Gate Array (FPGA), a Programmable Logic Device, a Programmable Array Logic (PAL) etc. In embodiments, the control unit 14 may also be implemented using one or more Application Specific Integrated Circuits (ASIC).

In the embodiment depicted in FIG. 1 the control unit 14 is configured to provide the transducer 12 with a first electrical signal based on which the transducer 12 provides an acoustical transmit signal. The control unit 14 is further configured to obtain a second electrical signal from the transducer 12. The second electrical signal is based on a reflected version of the acoustical transmit signal. The control unit 14 is further configured to process the second electrical signal to obtain information indicating the tread depth 20 of the tire 30. As shown in FIG. 1 the tread depth 20 is here defined as a height of the profile or pattern of the tire 30, which is, however, an example used in this embodiment. It is noted that there are other metrics which could also serve as information indication tire tread depth, such as the thickness of the tire's wall in radial direction, a depth of recesses in the tire 30, etc.

In a further embodiment the device comprises a transmitter 16 (shown optionally in FIG. 1 by use of broken lines) to transmit tire tread depth information to a receiver of the vehicle (e.g. as part of an Electronic Control Unit (ECU)). The transmitter 16 is coupled to the control unit 14, optionally via an interface 18, which is described subsequently. In a further embodiment the transmitter 16 may be part of a transceiver being configured to transmit and to receive, e.g. to receive information from a controller in the vehicle, e.g. a trigger to measure the tread depth. In the following multiple embodiments will be detailed, some of which use multiple devices 10 to measure tire tread depth information at multiple positions of the tire 30. Such multiple devices 10 may communicate among each other and they may communicate with the vehicle, a controller thereof, respectively. Such communication may be carried out through the transmitter/receiver/transceiver 16 or through the optional interface 18, and which is coupled to the control unit 14 and optionally to the transmitter/receiver/transceiver 16. In some embodiments the communication between the devices 10 may use different media than the communication with the vehicle, in some embodiments inter-device communication and communication with the vehicle may use the same medium, e.g. radio frequency communication.

The transmitter/receiver/transceiver 16, may be implemented as any means for transmitting, receiving, or transceiving, i.e. receiving and/or transmitting etc., one or more receiver, transmitter or transceiver units, one or more receiver, transmitter or transceiver devices and it may comprise typical receiver, transmitter and/or transceiver components, such as one or more elements of the group of one or more Low-Noise Amplifiers (LNAs), one or more Power Amplifiers (PAs), one or more filters or filter circuitry, one or more diplexers, one or more duplexers, one or more Analog-to-Digital converters (ND), one or more Digital-to- Analog converters (D/A), one or more modulators or demodulators, one or more mixers, one or more antennas, one or more coils, etc.

In a further embodiment the control unit 14 is configured to provide the information indicating the tread depth 20 of the tire 30 to the transmitter 16, which then transmits said information to the vehicle control, e.g. an ECU. The interface 18 may optionally serve to communicate information with another device to obtain information indicating a tread depth 20 of a tire 30. The control unit 14 is then configured to control the interface 18. In embodiments the interface 18 may be configured to transmit and/or to receive information from another device using sound, light or radio frequency communications. It is to be noted that inside the tire interdevice communication may be less complex (line-of-sight communication, all devices may undergo the same motion, stable relative positions, etc.) as communication from inside the tire 30 to the outside of the tire 30, e.g. to a receiver at the vehicle.

The control unit 14 is configured to collect tire tread depth information from a plurality of tire tread measurement devices using the interface 18 in a further embodiment. The device 10 assumes a master communication role (collects and forwards information), while other devices assume a slave role (provide the information to the master device). The (master) device 10 processes the tire tread depth information from the plurality of tire tread measurement devices to obtain the information indicating the tread depth. The information indicating the tread depth may hence be a combination or a selection of the corresponding information from the plurality of devices in some embodiments. The control unit 14 may be configured to provide the collected information to a further control component (e.g. a receiver or ECU) of the vehicle. In some embodiments the device 10 may just forward the information obtained from the other devices and a combination or processing of the information may be carried out subsequently by another entity, e.g. an ECU of the vehicle.

In a further embodiment the control unit 14 is configured to obtain information on whether to collect or to provide tire tread depth information via the interface 18. The control unit 14 may receive an instruction via the interface 18 (and possibly further via the transceiver/receiver 16). Therewith tire tread depth measurements may be triggered. In some embodiments these measurements may be carried out periodically or based on certain events, e.g. the start of a vehicle's engine, a tire pressure measurement is carried out, etc. The transducer 12 may be configured to generate the acoustical transmit signal based on a trigger from the control unit 14. Such a trigger may be a simple pulse or a single bit that triggers the transducer 12 to generate the acoustical transmit signal, which may be an acoustical pulse, a waveform, a sequence of pulses or waveform, a chirp, a burst etc. In some embodiments the acoustical signal may be an acoustical copy of the first electrical signal and the transducer 12 may just convert between electrical and acoustical domain within the respective frequency ranges. Moreover, the transducer 12 may comprise separate acoustical transmitter 12a (to transmit the acoustical transmit signal) and receiver 12b (to receive the reflected version of the acoustical transmit signal) as indicated by the dotted lines in FIG. 1. So both options are conceivable for the transducer 12: separate modules for acoustical transmission 12a and reception 12b or a single module (e.g. a single membrane, or crystal or piezoelectric device).

Figure 2:
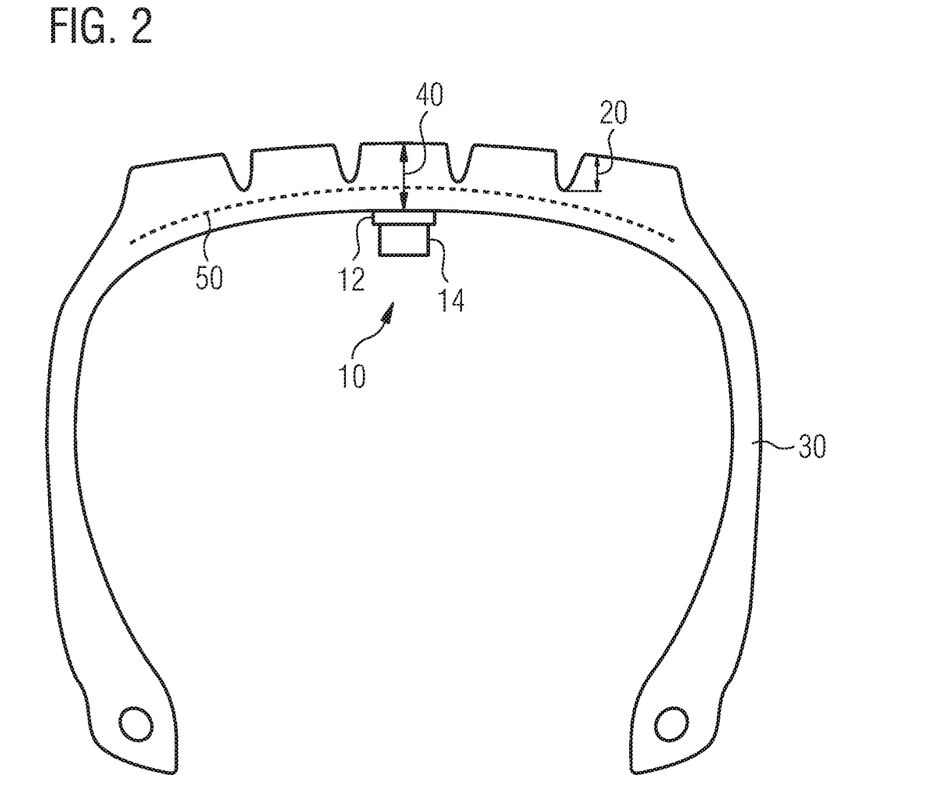
FIG. 2 illustrates an embodiment of a tire with an embodiment of a device to obtain information indicating a tread depth of a tire.

FIG. 2 illustrates another embodiment of a tire 30 with an embodiment of a device 10 to obtain information indicating a tread depth 20 of a tire 30. FIG. 2 shows a cross section of the tire 30 similar to FIG. 1. In FIG. 2 the device 10 is mounted on the inside of the tire 30, wherein one side of an electro-acoustical transducer 12 is in mechanical contact with the inside of the tire 30 and another side of the electro-acoustical transducer 12 is coupled to a control unit 14. The transducer 12 is configured to generate the acoustical transmit signal and to receive the reflected version of the acoustical transmit signal. The measured distances are indicated by arrow 40 in FIG. 2 and will be further detailed subsequently with the help of FIG. 3. The arrow 40 shows that the inside of the tire material is to be measured. A dotted line 50 in FIG. 2 indicates the carcass of the tire 30 and its axial extension. In the embodiment depicted in FIG. 2 the transducer 12 is configured to emit a burst of ultrasound as the acoustical transmit signal and to receive reflections of the burst as reflected version of the acoustic transmit signal. The transducer 12 is further configured to transduce the reflected version of the acoustical transmit signal into the second electrical signal.

Figure 3:
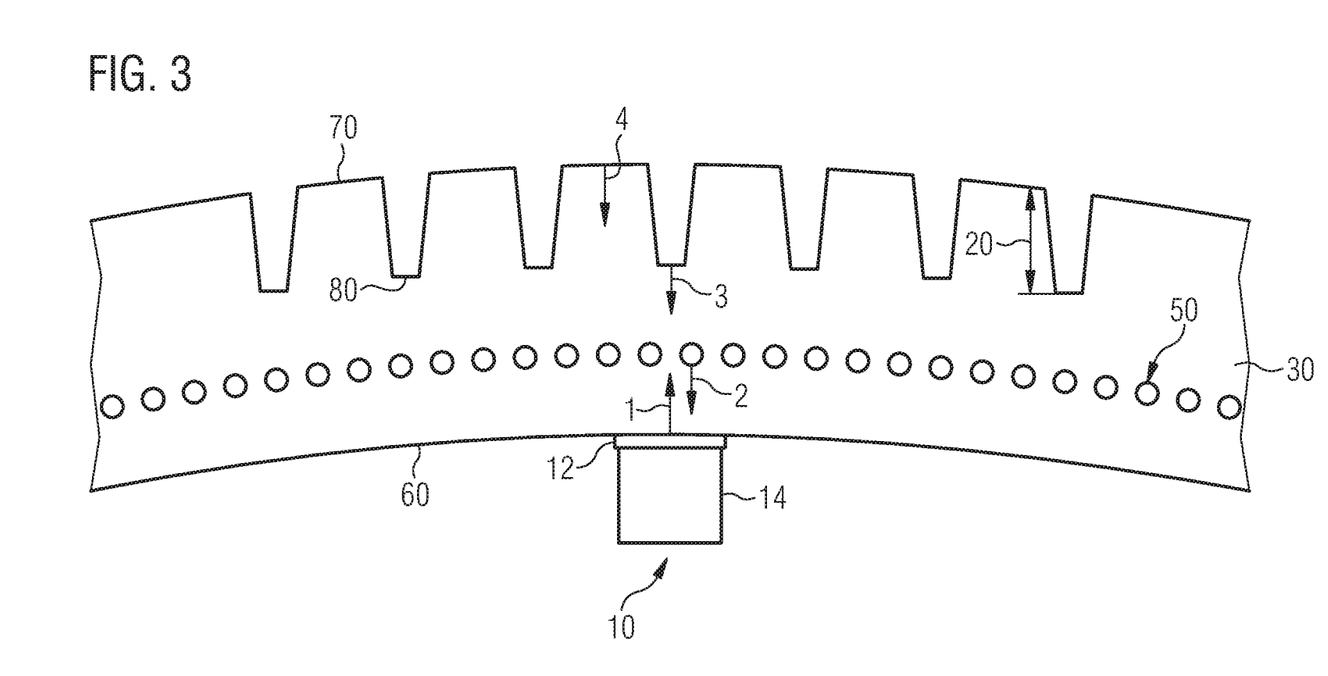
FIG. 3 shows an embodiment of a device illustrating different reflections in a tire.

FIG. 3 shows further details of the embodiment of the device 10 described in FIG. 2. FIG. 3 further illustrates different reflections in the tire 30. FIG. 3 shows a magnified section of the tire 30 with the carcass 50 and the device 10 (comprising an electro-acoustical transducer 12 and a control unit 14). In FIG. 3 the inner surface 60 of the tire 30 is shown at the bottom and the outer surface 70 of the tire 30 is shown at the top. The tread depth 20 of the tire 30 in this embodiment is defined as the distance between the outer surface 70 and the ground of tread 80.

In the embodiment illustrated by FIGS. 2 and 3 the control unit 14 is configured to determine multiple reflections of the acoustical transmit signal in the second electrical signal. The control unit 14 is further configured to determine information on the tread depth 20 (information indicating the tread depth) based on a relative timing of the multiple reflections in the second electrical signal. The tread depth is measured by sound. The electroacoustic transducer 12 sits at the inner surface 60 of the tire 30 and is connected to the control unit 14. The control unit 14 excites the transducer 12 with the first electrical signal and the transducer converts the electrical signal into a mechanical/acoustical signal as is referenced by arrow 1 in FIG. 3. This mechanical signal runs as structure-borne sound through the tire 30. It is reflected at inhomogeneities in the tire 30 and at the outer surface 70 of the tire 30. The reflected sound that comes back to the transducer 12 is converted to the second electrical signal by the transducer 12. The control unit 14 processes this signal to determine the tread depth. This information is then sent to a receiver in the car, e.g. using a transmitter 16 and optionally via an interface 18, cf. FIG. 1. Generally in embodiments, there may be exactly one electroacoustic transducer 12 that acts as generator of sound and as receiver of sound. The first and the second electrical signal may then be transferred via the same electrical interconnection.

There may be one or more transducers acting as generator of sound and one or more transducers acting as receiver of sound in further embodiments. The device 10 may then comprise a plurality of transducers 12 configured to provide a plurality of acoustical transmit signals and configured to obtain a plurality of reflected versions of the plurality of acoustical transmit signals. As has been laid out above, inter-communication between the transducers of the plurality of transducers may take place. This may be in an adhoc network manner, where the transducers are coordinated on when to measure and/or when to communicate information. Possible scenarios are that one device plays the role of a master node coordinating or instructing the others, possible also collecting and/or processing information from the other nodes before forwarding to a receiver of the vehicle. In another embodiment the plurality of transducers may correspond to a plurality of autonomous devices or being coordinated by another entity, e.g. an ECU or another device in or at the tire 30, such as a TPMS. In other words, each unit or device 10 may individually communicate with a receiver in the car. The units or devices 10 in the tire 30 may communicate with one dedicated (master) unit in the tire 30. This dedicated unit may collect information from the other units and transmit it to the receiver in the car. The assignment "dedicated unit" might not necessarily be fixed to one unit. The assignment may be changed depending on the situation. In case of fixed assignment, other units do not necessarily need an RF transmitter to communicate with the receiver in the car.

In the embodiment in FIG. 3 the measurement is performed in a similar way as in medical ultrasonic scanners or medical applications that emit a short burst of ultrasound, referenced by 1 in FIG. 3, receive the reflections of that burst that are generated at any inhomogeneity of the scanned object, indicated by references 2, 3 and 4 in FIG. 3, and calculate from the received signals the mechanical dimensions of the scanned object. In FIG. 3 reference 1 indicates emission of the burst, 2 indicates a reflection at the carcass 50, 3 indicates a reflection at the ground of the tread 80, and 4 indicates a reflection at the outer surface 70 of the tire 30. In further embodiments or circumstances there may be more or less reflections.

The velocity of sound through the rubber material of the tire 30 may depend on temperature, on the age of the tire 30 and on other factors. The control unit 14 may be configured to determine the information indicating the tread depth based on one or more elements of the group of temperature information, aging information of the tire 30, material information, type information, pressure information, ground or road surface information. These factors may influence the measurement and may be taken into account. The constant distance to the carcass 50 or to the ground of the tread 80, which is not as influenced by wear-down and abrasion as the outer surface 70 of the tire 30 (emission 1 versus reflections 2 and 3) can be used to calibrate the measurement of the tread depth 20 (reflection 4 versus reflection 3). The control unit 14 may be configured to determine information indicating the depth of a carcass 50 of the tire 30. The control unit 14 is configured to determine the information indicating the tread depth 20 based on the information indicating the depth of the carcass 50.

The reflection at the ground of the tread may depend on whether this area is in air or is immersed in water. During driving, when the tire rotates, by comparing the reflection before ground contact with the reflection during ground contact, the presence of water on the road can be detected. In such an embodiment the control unit 14 is configured to determine information indicating a presence of water on the tire 30 by comparing a reflection before ground contact of the tire 30 with a reflection during ground contact of the tire 30. In some embodiments the control unit 14 may be configured to determine information indicating a presence of water on the tire. The control unit may be configured to determine the information indicating the presence of water on the tire by comparing a reflection before ground contact of the tire with a reflection during ground contact of the tire. In further embodiments the control unit may be configured to generate a warning for a driver of the vehicle in case the presence of water is detected on the tire. In another embodiment the control unit may be configured to adapt the vehicle dynamics in case the presence of water is detected. In some embodiments the control unit may be configured to compensate a tread depth measurement based on a water film or layer in case the presence of water is detected on the tire.

In some embodiments a resonance frequency of a standing wave as generated by the transducer or reflection properties/behavior of the material or material combination of the tire (e.g. thickness, tread depth, stabilizers, media in the tire, media on the outside of the tire), which may change when entering or exiting a water film or layer, when water gets centrifuged from the tire, respectively. The control unit 14 may be configured to determine changes in reflection properties when the tire enters or exits a water film or layer, when water gets centrifuged or thrown from the outside of the tire, respectively.

The measurement itself can be performed in different ways in embodiments. For example, the measurement may be performed by exciting a resonance, a standing wave of sound between inner 60 and outer tire surface 70, and by measuring its frequency. This frequency may depend on whether the part of the tire 30 where the tread depth measurement unit or the device 10 is located has contact to the road or not. The absolute and the relative values of the resonance frequencies may be evaluated to calculate the tread depth 20. In the embodiment depicted in FIG. 3 the control unit 14 is configured to excite a standing wave of sound between the inner 60 and an outer tire surface 70. The control unit 14 is configured to determine a resonance frequency of the standing wave, and the control unit 14 is further configured to determine whether a measured part of the tire 30 has contact to the ground. Such detection may, for example, be carried out by means of acceleration sensors or by analyzing an output signal of an energy harvester.

There may be one or more than one tread depth measurement units or devices 10 located in one tire 30. In case more than one tread depth measurement units or devices 10 are located in one tire 30, the units may exchange information via sound, via light or via radio frequency. The interface 18 may then be accordingly adapted to the medium of communication, possibly also taking into account the different propagation characteristics of the respective media, and within the tire 30. The control unit 14 of the device 10 or tread depth measurement unit can be combined with or integrated into a TPMS module, which is the wheel unit of a TPMS, so the tread depth measurement results can be transmitted via the RF transmitter of the TPMS system. The control unit 14 is hence part of a TPMS in a further embodiment. TPMS are designed to monitor the air pressure inside of pneumatic tires on various types of vehicles. Therefore pressure sensors are used in the tires and the system may report the tire pressure information to the driver of the vehicle.

Wireless transmission can be used to transmit information on the pressure data to a centralized receiver component in the vehicle and, at least in some embodiments, the tire tread depth information may be transmitted therewith. Such a configuration may enable the system to report or signal pressure losses of the tires and tread depth status to the driver. Some known TPMSs provide localization information on the tire 30 or wheel on top of pressure information so as to indicate to a driver of a vehicle the position of a wheel having a pressure loss, and so may be the tire tread depth information. FIGS. 1 to 3 also illustrate an embodiment of a tire 30 comprising the device 10. The device 10 is glued onto the inner surface 60 of the tire 30. In other embodiments device 10 may be mounted into a fixture of the tire 30 or a wheel carrying the tire 30. The tread depth measurement unit or device 10 (transducer(s) 12 and control unit(s) 14) can be glued onto the inner surface 60 of the tire 30 or can be put into a fixture as used for mounting TPMS modules.

The signals generated by the electroacoustic transducer 12 when the tire 30 hits and leaves the road can be used to power the tread depth measurement unit, device 10, or a TPMS system that is used to transmit the information acquired by the tread depth measurement unit or device by energy harvesting. The device is then further configured to convert mechanical energy from tire deformation into electrical energy for powering the device 10, e.g. using an energy harvester. In some embodiments the transducer 12 may serve as energy harvester as well. For example, the deformations of the tire when rotating in and out of contact with the ground may be used to generate electrical signals, which can be used to power the device 10 or additionally or alternatively also other devices, e.g. a TPMS. Embodiments may be integrated into a wheel unit of a direct TPMS that may also trigger the measurements and send the measurement results to a receiver in the car. Another embodiment is therefore a TPMS comprising a device 10.

At the vehicle, the current tread depth can be displayed to the driver and it can also be used to adapt the regulation of the vehicle dynamics to the tread depth. Also for safety reasons or in order to comply with legal regulations a hint to replace the tire 30 can be given to the driver. If water on the road is detected, the driver can be warned to adapt the speed accordingly and the vehicle dynamics may also be adapted according to this information.

Ultrasound images can be produced, e.g. in a similar way as in standard medical equipment. The requirements for measuring the tread depth of a tire 30 are somewhat relaxed compared to medical requirements.

Figure 4:
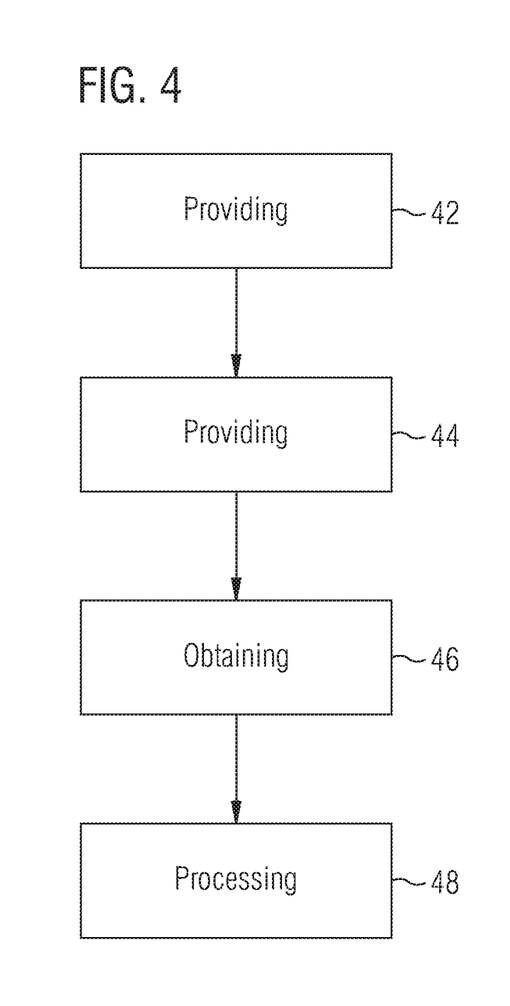
FIG. 4 depicts a block diagram of a flow chart of an embodiment of a method for obtaining information indicating a tread depth of a tire.

FIG. 4 depicts a block diagram of a flow chart of an embodiment of a method for obtaining information indicating a tread depth 20 of a tire 30 of a vehicle. The method comprises providing 42 a first electrical signal and providing 44 an acoustical transmit signal based on the first electrical signal. The method further comprises obtaining 46 a second electrical signal. The second electrical signal is based on a reflected version of the acoustical transmit signal. The method further comprises processing 48 the second electrical signal to obtain information indicating the tread depth 20 of the tire 30.

Another embodiment is a computer program having a program code on a non-transitory media for performing, when the computer program is executed on a computer or on a processor, one of the above methods.

A further embodiment is a computer readable storage medium storing instructions which, when executed by a computer, cause the computer to implement one of the methods described herein. Other embodiments are a computer program or a computer program product having a program code for performing anyone of the above described methods, when the computer program or computer program product is executed on a processor, computer, or programmable hardware.

A person of skill in the art would readily recognize that steps of various above-described methods may be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as magnetic disks and magnetic tapes, hard drives, or optically readable digital data storage media. The embodiments are also intended to cover computers programmed to perform said steps of the above-described methods or (field) programmable logic arrays ((F)PLAs) or (field) programmable gate arrays ((F)PGAs), programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the Figures, including any functional blocks labeled as "means", may be provided through the use of dedicated hardware, such as "a processor", "a sensor", "a controller", "a transmitter", "a receiver" etc. as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

Further, it is to be understood that the disclosure of multiple steps or functions disclosed in the specification or claims may not be construed as to be within the specific order. Therefore, the disclosure of multiple steps or functions will not limit these to a particular order unless such steps or functions are not interchangeable for technical reasons.

Furthermore, in some embodiments a single step may include or may be broken into multiple substeps. Such substeps may be included and part of the disclosure of this single step unless explicitly excluded.

What is claimed is:

1. A device to obtain information indicating a tread depth of a tire of a vehicle, comprising
a transducer to provide acoustical signals based on electrical signals and vice versa; and
a control unit, which is coupled to the transducer, wherein the control unit is configured to:
provide the transducer with a first electrical signal based on which the transducer provides an acoustical transmit signal,
obtain a second electrical signal from the transducer, the second electrical signal being based on a reflected version of the acoustical transmit signal, wherein the reflected version comprises a first reflection from an outer tire surface, a second reflection from a first reference location, and a third reflection from a second reference location, wherein first and second reference locations are different and are located in the tire between the transducer and the outer tire surface, and
process the second electrical signal to obtain information indicating the tread depth of the tire.

2. The device of claim 1, further comprising a transmitter to transmit tire tread depth information to a receiver of the vehicle, wherein the transmitter is coupled to the control unit, and wherein the control unit is configured to provide the information indicating the tread depth of the tire to the transmitter.

3. The device according to claim 1, wherein the transducer is configured to generate the acoustical transmit signal based on a trigger from the control unit, and/or wherein the transducer is configured to generate the acoustical transmit signal and to receive the reflected version of the acoustical transmit signal.

4. The device according to claim 1, wherein the transducer comprises an acoustical receiver to receive the reflected version of the acoustical transmit signal, and/or comprising a plurality of transducers configured to provide a plurality of acoustical transmit signals and configured to obtain a plurality of reflected versions of the plurality acoustical transmit signals.

5. The device according to claim 1, wherein the transducer is configured to emit a burst of ultrasound as the acoustical transmit signal and to receive reflections of the burst as reflected version of the acoustic transmit signal, wherein the transducer is further configured to transduce the reflected version of the acoustical transmit signal into the second electrical signal.

6. The device according to claim 1, wherein the control unit is configured to determine multiple reflections of the acoustical transmit signal in the second electrical signal, wherein the control unit is configured to determine the information indicating the tread depth based on a relative timing of the multiple reflections in the second electrical signal, and/or wherein the control unit is configured to further determine the information indicating the tread depth based on one or more elements of a group of temperature information, aging information of the tire, material information, type information, pressure information, road or ground surface information.

7. The device according to claim 1, wherein the first reference location is at a ground of the tread, and the second reference location is at a carcass of the tire, wherein the carcass is located a non-zero distance from the ground of the tread toward the transducer, wherein the control unit is configured to determine information indicating a depth of the carcass from the transducer.

8. The device according to claim 1 being further configured to convert mechanical energy from tire deformation into electrical energy for powering the device.

9. The device according to claim 1, wherein the control unit is part of a tire pressure measurement system.

10. A tire pressure measuring system comprising a device according to claim 1.

11. A tire comprising a device according to claim 1.

12. The tire of claim 11, wherein the device is glued onto an inner surface of the tire or wherein the device is mounted into a fixture of the tire or a wheel carrying the tire.

13. The device of claim 1, further comprising an interface to communicate information with another device to obtain information indicating a tread depth of a tire, and wherein the control unit is configured to control the interface.

14. The device according to claim 13, wherein the interface is configured to transmit and/or to receive information from another device using sound, light or radio frequency communications, and/or wherein the control unit is configured to collect tire tread depth information from a plurality of tire tread measurement devices using the interface and process the tire tread depth information from the plurality of tire tread measurement devices to obtain the information indicating the tread depth and/or wherein the control unit is further configured to provide the collected information to a further control component of the vehicle.

15. The device according to claim 13, wherein the control unit is configured to obtain information on whether to collect or to provide tire tread depth information via the interface.

16. A device to obtain information indicating a tread depth of a tire of a vehicle, comprising:
a transducer to provide acoustical signals based on electrical signals and vice versa; and
a control unit, which is coupled to the transducer, wherein the control unit is configured to:
provide the transducer with a first electrical signal based on which the transducer provides an acoustical transmit signal,
obtain a second electrical signal from the transducer, the second electrical signal being based on a reflected version of the acoustical transmit signal,
process the second electrical signal to obtain information indicating the tread depth of the tire, and
process the second electrical signal to determine information indicating a presence of water on the tire.

17. The device of claim 16, wherein the control unit is configured to process one or more instantiations of the second electrical signal to determine the information indicating the presence of water on the tire by comparing a first instantiation of the second electrical signal before ground contact of the tire with a second instantiation of the second electrical signal during ground contact of the tire.

18. The device of claim 16, wherein the control unit is configured to generate a warning for a driver of the vehicle in case the presence of water is detected on the tire.

19. The device of claim 16, wherein the control unit is configured to adapt vehicle dynamics in case the presence of water is detected.

20. The device of claim 16, wherein the control unit is configured to compensate a tread depth measurement based on a water film or layer in case the presence of water is detected on the tire.

* * * * *